(12) United States Patent
Rosselli et al.

(10) Patent No.: US 8,443,849 B2
(45) Date of Patent: May 21, 2013

(54) APPARATUS AND METHOD FOR DRAINING IRRIGATION SYSTEMS

(76) Inventors: Joseph Rosselli, Massapequa Park, NY (US); Arto Cinoglu, Rockville Centre, NY (US)

( * ) Notice: Subject to any disclaimer, the term of this patent is extended or adjusted under 35 U.S.C. 154(b) by 1145 days.

(21) Appl. No.: 12/131,094

(22) Filed: Jun. 1, 2008

(65) Prior Publication Data

US 2008/0302882 A1 Dec. 11, 2008

Related U.S. Application Data

(60) Provisional application No. 60/933,173, filed on Jun. 5, 2007, provisional application No. 60/936,945, filed on Jun. 23, 2007.

(51) Int. Cl.
*A01G 25/00* (2006.01)

(52) U.S. Cl.
USPC .............. 141/65; 141/8; 141/98; 141/231; 47/48.5; 137/62; 137/78.2; 137/79; 137/624.18

(58) Field of Classification Search
USPC ........ 141/8, 65, 98, 231; 47/48.5; 137/61–62, 137/79, 78.2, 624.18
See application file for complete search history.

(56) References Cited

U.S. PATENT DOCUMENTS

| | | | |
|---|---|---|---|
| 4,763,837 A | 8/1988 | Livneh | |
| 5,413,134 A * | 5/1995 | Burgess et al. | 137/1 |
| 5,598,867 A | 2/1997 | Sullivan | |
| 5,694,963 A | 12/1997 | Fredell et al. | |
| 5,752,784 A * | 5/1998 | Motz et al. | 405/38 |
| 5,944,444 A * | 8/1999 | Motz et al. | 137/78.2 |
| 6,453,215 B1 * | 9/2002 | Lavoie | 700/284 |
| 6,763,845 B2 * | 7/2004 | Hoggard | 137/61 |
| 6,808,127 B2 | 10/2004 | McNulty et al. | |
| 7,232,078 B2 | 6/2007 | Kah, Jr. | |
| 7,377,286 B2 * | 5/2008 | King et al. | 137/1 |
| 7,404,899 B2 * | 7/2008 | Rosen et al. | 210/652 |
| 2004/0045600 A1 * | 3/2004 | Hoggard | 137/61 |

* cited by examiner

*Primary Examiner* — Gregory Huson
*Assistant Examiner* — Nicolas A Arnett
(74) *Attorney, Agent, or Firm* — IP Strategies

(57) ABSTRACT

An irrigation system draining apparatus adapted for use with an irrigation system having a conduit with a fluid source connection, an air inlet, and at least one output port, the apparatus includes a suction device. The suction device has an input port that is adapted to access an interior of the conduit, and to drain fluid from the conduit by suction when the fluid source connection is closed and the air inlet is open. A method of draining an irrigation system includes closing a fluid source connection for the irrigation system, opening an air inlet of the irrigation system, and using a suction device to drain fluid from the irrigation system conduit through the one output port.

14 Claims, 6 Drawing Sheets

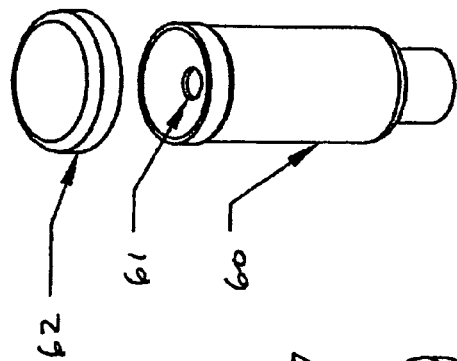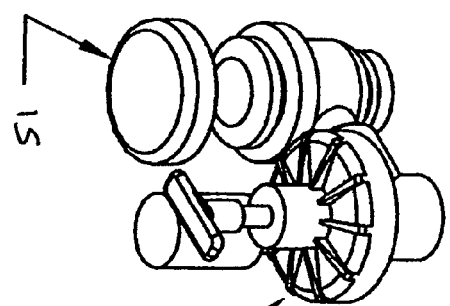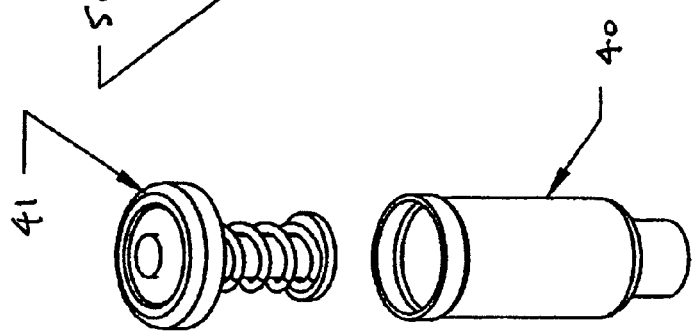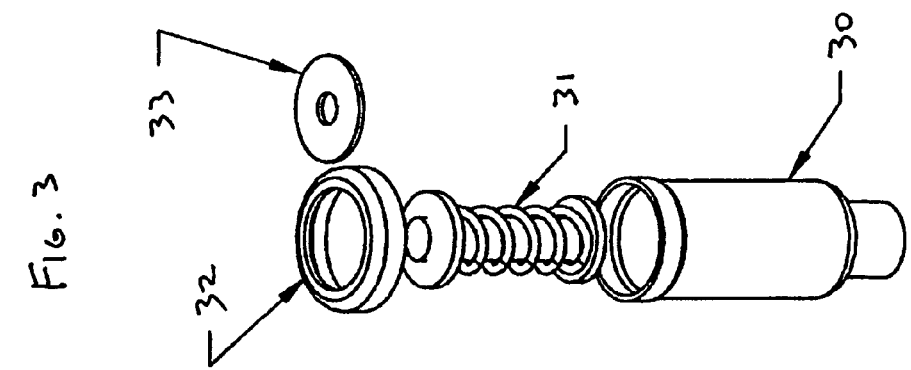

APPARATUS AND METHOD FOR DRAINING IRRIGATION SYSTEMS

CROSS-REFERENCE TO RELATED APPLICATIONS

This is related to and claims priority from U.S. Provisional Patent Application Ser. No. 60/922,441, which was filed on Apr. 9, 2007; U.S. Provisional Patent Application Ser. No. 60/933,173, which was filed on Jun. 5, 2007; U.S. Provisional Patent Application Ser. No. 60/936,945, which was filed on Jun. 23, 2007.

FIELD OF THE INVENTION

The invention relates to an apparatus for winterizing an irrigation system, such as a sprinkler system, and a method for winterizing an irrigation system by draining excess fluid from the system.

BACKGROUND OF THE INVENTION

Irrigation systems are well-known and can be found in wide-spread use. Typical systems include at least one length of pipe having a number of sprinkler heads distributed so as to cover a desired pattern for watering. The pipe, or pipes in the case of a multiple-zone system, is usually buried underground, with the sprinkler heads rising above ground level at least during use. If, during the winter months, the frost level extends below the level of the pipe, water within the pipe can expand as the temperature approaches freezing and can damage the pipe or other components of the system. For at least this reason, it is important to "winterize" an irrigation system by draining a substantial portion of the water left in the system when not in use.

Conventional winterizing systems use compressed air to blow excess fluid from the interior of the sprinkler system. However, compressed air can damage underground appliances and fixtures such as sprinkler heads, hose connectors, zone valves, and water delivery lines. Compressed air can also flutter backflow prevention valve seals. This can damage the backflow prevention valve and cause it to fail. Systems with faulty backflow prevention valves are at risk of allowing water to siphon back into plumbing lines, which can contaminate drinking water.

An improved system is needed that will remove water and other fluids from irrigation lines to avoid damage from frost. Preferably, such a system would not require operation by a qualified service person, and would not be likely to damage components of the irrigation system.

BRIEF SUMMARY OF THE INVENTION

The invention is a system that is contemplated for use with household and commercial irrigation and sprinkler systems, and not on indoor plumbing systems. The system of the invention uses negative pressure to remove fluid from the irrigation/sprinkler system, rather than using compressed air as in conventional systems.

According to an aspect of the invention, an irrigation system draining apparatus is adapted for use with an irrigation system having a conduit with a fluid source connection, an air inlet, and at least one output port. The apparatus includes a suction device having an input port that is adapted to access an interior of the conduit, for example, by being sealed against one of the output ports, and to drain fluid from the conduit by suction when the fluid source connection is closed and the air inlet is open.

The suction device can include a suction head, a suction nozzle, and an effluent port. The suction head has a motor and an impeller adapted to create negative air pressure, and an exhaust vent. The suction nozzle is connected to the suction head and is adapted to be sealed against one output port of the irrigation system such that the negative air pressure created by the suction head is applied to the interior of the conduit. The effluent port is connected to the suction head and is adapted to discharge fluid drained from the conduit by the suction head through the suction nozzle. The suction device can also include a collection chamber and a fluid release valve. The collection chamber is disposed between the suction head and the effluent port, and is adapted to store fluid drained from the conduit. The fluid release valve is coupled to the effluent port and is adapted to control discharge of the fluid from the collection chamber. The collection chamber can include a fluid level indicator.

The suction device can be a portable unit. For example, the suction head can be arranged above the suction nozzle so as to be supported at least in part by the suction nozzle when the suction nozzle is sealed against the output port of the irrigation system and the suction device is in use. The suction device can also include a collection tube disposed between the suction nozzle and the suction head. Alternatively, the suction device can include a housing and a flexible collection tube disposed between the suction nozzle and the suction head. Wheels can be coupled to the housing to provide rolling support for the device.

The apparatus of the invention can be adapted for use with an irrigation system having a number of conduits, where each conduit has at least one output port, a fluid source connection coupled to the conduits by a respective number of valves, and an air inlet. In this case, the apparatus of the invention can also include a control device that is adapted to open and close individual valves automatically, to coordinate with use of the suction device on output ports of the respective conduits. The control device can also be adapted to control operation of the suction device.

For example, the control device can be adapted to sequentially open and close individual valves, and can be adapted to cycle through the sequence at a predetermined rate. The control device can also be adapted to open and close the fluid source connection.

The control device can include a processor. In this case, the apparatus can also include a remote input device that is adapted to accept user inputs and provide corresponding input signals to the processor. Also, the zone valves can be incorporated as part of the invention, as a processor-controllable valve assembly such as a rotary valve, to be controlled by the control device processor.

The apparatus of the invention can also include a parameter-reading device that is adapted to provide parameter data to the processor. The control device can be adapted to actuate the apparatus automatically when the parameter data provided to the processor falls within a predetermined range. For example, the parameter data can be temperature data, and the predetermined range can be values of temperature data corresponding to temperature below a predetermined threshold, preferably for a predetermined time. Thus, when the measured temperature falls below a certain value, the control device will automatically actuate the apparatus to drain the conduit(s).

The suction device and the control device can be integrated and adapted to be connected to the irrigation system as a unitary device. The apparatus of the invention can include a number of control devices. Each control device can be adapted to open and close a respective one valve automatically, to coordinate with use of the suction device on output ports of the respective conduits. In this way, the apparatus of the invention provides for central control of drainage of a number of conduits in the irrigation system, or individual in-line control of each conduit.

According to another aspect of the invention, a method of draining an irrigation system includes closing a fluid source connection for the irrigation system. An air inlet of the irrigation system is opened. Fluid is drained from the irrigation system conduit through the output port using a suction device. Prior to draining the fluid, one or more output ports can be sealed closed Using the suction device in this manner can include sealing a suction nozzle against the output port. The suction nozzle is connected to a suction head having a motor and an impeller adapted to create negative air pressure, and an exhaust vent. The fluid drained from the conduit is discharged through an effluent port. The fluid drained from the conduit can also be stored in a collection chamber prior to discharge of the fluid, which can be controlled by using a fluid release valve coupled to the effluent port. The collection chamber can include a fluid level indicator.

The suction device can be provided as a portable unit, which can be used by sealing the suction nozzle against the one output port and arranging the suction head above the suction nozzle so as to be supported at least in part on the suction nozzle. The suction device can be provided with a collection tube disposed between the suction nozzle and the suction head. Alternatively, the portable suction device can include a housing and a flexible collection tube disposed between the suction nozzle and the suction head. The housing can be provided with wheels for rolling support.

Opening and closing of a number of valves for a respective number of conduits of the irrigation system can be automatically controlled to coordinate with use of the suction device using a control device. The control device can also be used to control operation of the suction device.

For example, individual valves can be sequentially opened and closed using the control device, which can also control cycling through the sequence at a predetermined rate. The control device can also control opening and closing the fluid source connection.

The method of the invention can also include providing user inputs to a remote input device. Input signals corresponding to the user inputs can be sent to a processor of the control device by the remote input device.

Parameter data can also be provided to the processor from a parameter-reading device. If the received parameter data falls within a predetermined range, the method of the invention can be actuated automatically by the control device. For example, the parameter data can be temperature data and the predetermined range can be values of temperature data corresponding to a temperature below a predetermined threshold. Thus, when the measured temperature falls below a certain value, the control device will automatically actuate the apparatus to drain the conduit(s).

The suction device and the control unit can be connected to the irrigation system as an integrated unit. A number of suction devices can be provided, and the control device can be used to operate a respective suction device automatically to coordinate with draining of a respective conduit. In this way, the method of the invention provides for central control of drainage of a number of conduits in the irrigation system, or individual in-line control of each conduit.

BRIEF DESCRIPTION OF THE DRAWINGS

FIG. 3 shows an exemplary sprinkler head arrangement.
FIG. 4 shows an exemplary sprinkler head arrangement.
FIG. 5 shows an exemplary anti-siphon valve arrangement.
FIG. 6 shows an exemplary receptacle cap arrangement.

DETAILED DESCRIPTION OF THE INVENTION

Figure 1:
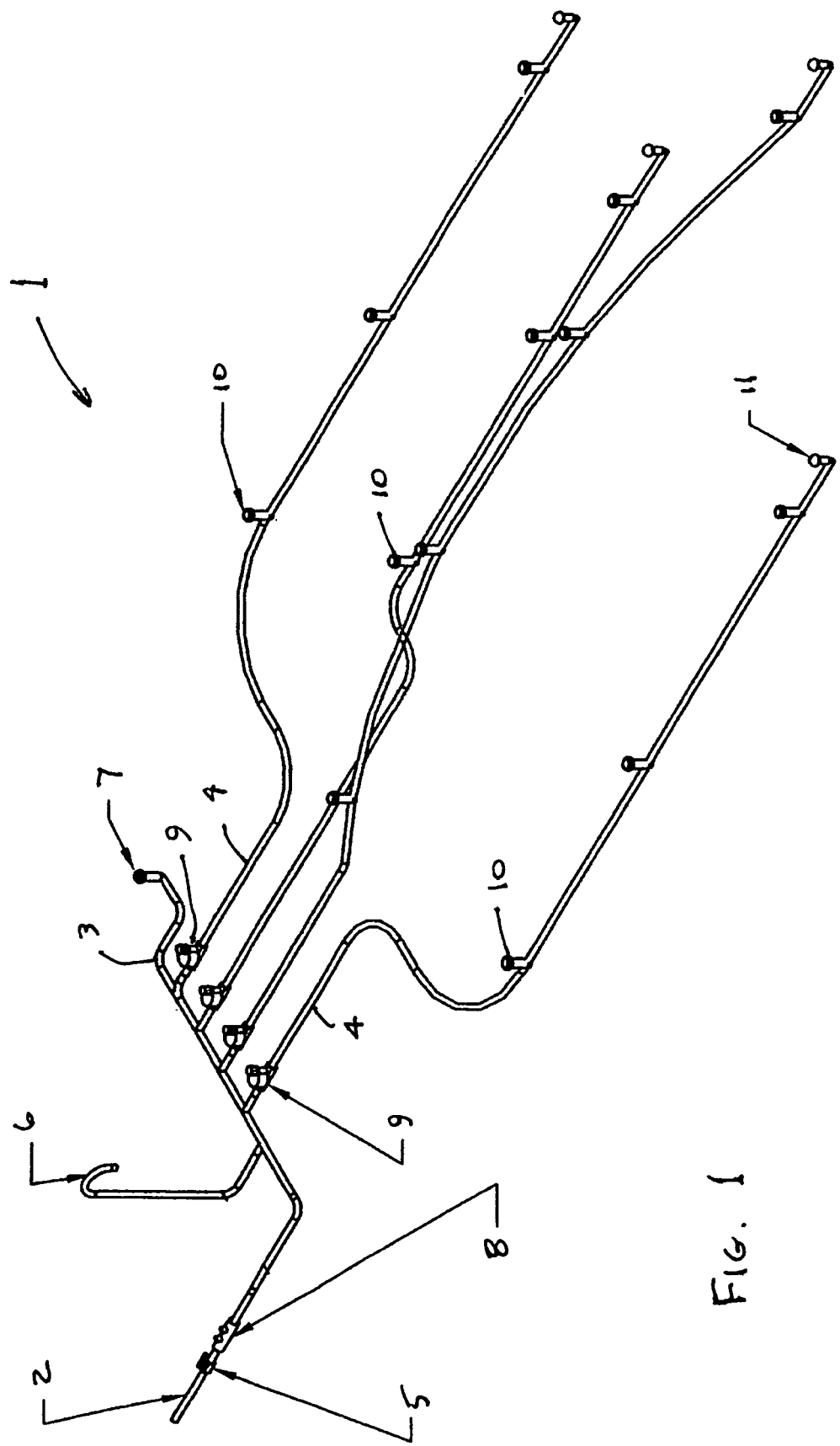
FIG. 1 shows a layout of an exemplary irrigation system.

FIG. 1 shows a typical sprinkler system layout 1. As shown, a main water source 2 is connected to provide water to a manifold 3 that distributes the water among several conduits or pipes 4, arranged as sprinkler zones. The manifold 3 is provided with a main water source valve 5, an air inlet 6, a receptacle 7, a backflow prevention valve 8, and a number of zone valves 9, each of which corresponds to one of the system zones. As will be described later, the receptacle 7 can be coupled to other components for automation of processes of the system 1. As shown, each zone includes a number of output ports 10 that are coupled to sprinkler heads arranged along the length of the zone conduit, as well as an air inlet valve 11 at the end of each zone. This air inlet valve 11 is a particular feature of the invention, which will be described below. The main water source valve 2 is used to control sourcing of water to the system, and the zone valves 9 are used to control flow of the provided water among the zones. When the main water source valve 2 is open, sprinkler heads connected to output ports of zones also having an open zone valve 9 will spray water over the surrounding area.

The exemplary layout shown in FIG. 1 is not the only known or advantageous arrangement, and is used for convenience of explanation and not limitation. For example, systems having a single line instead of multiple zones, and systems having auxiliary lines that branch off of a main line, also exist, and these and other variations are contemplated as applicable to the apparatus and method of the invention.

Figure 2:
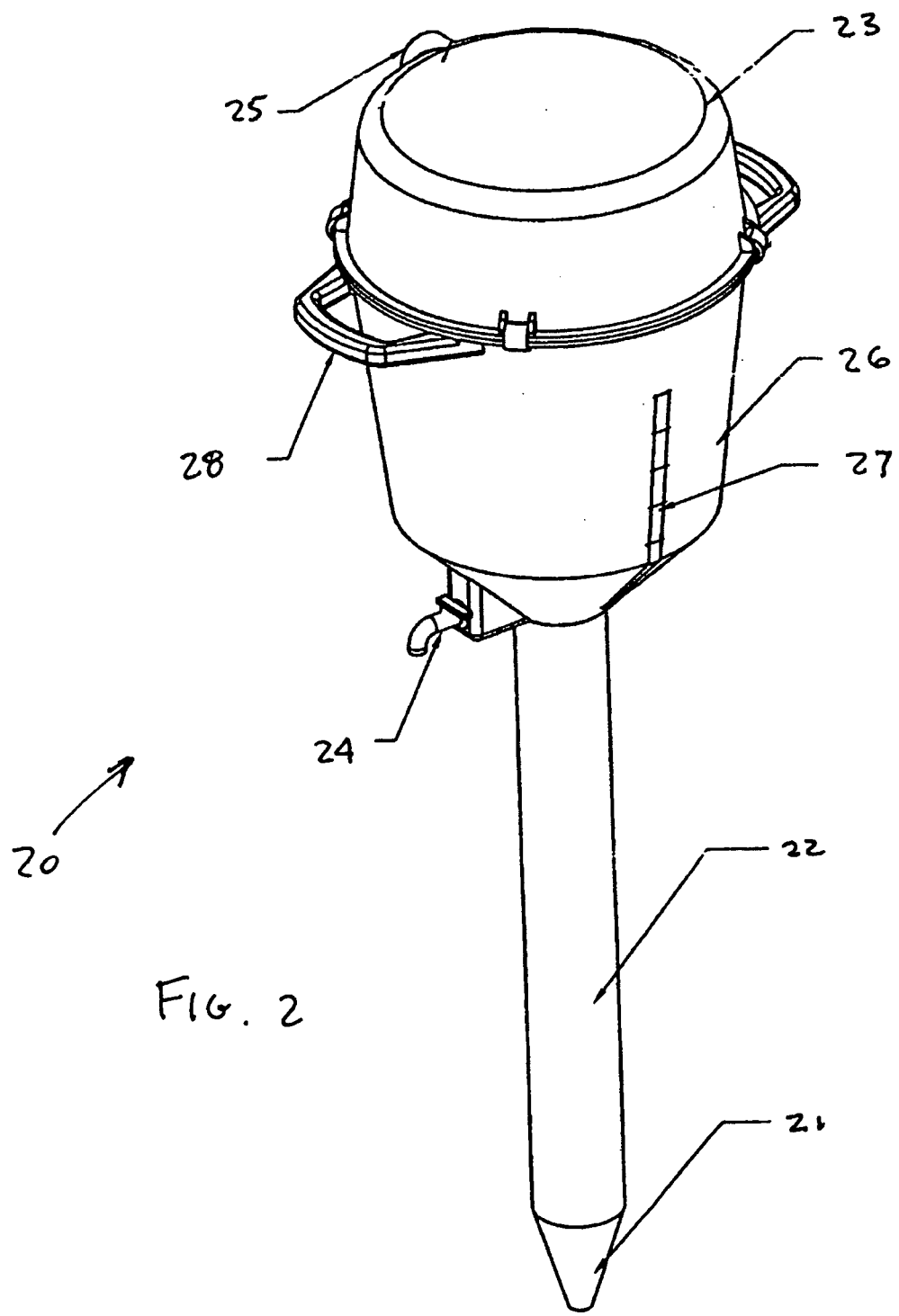
FIG. 2 shows an exemplary portable suction device.

FIG. 2 shows an exemplary irrigation system draining apparatus that is adapted for use with such an irrigation system. The apparatus includes a suction device 20 having an input port or collector nozzle 21 and collector tube 22 that when used is sealed against one of the irrigation system output ports 10, and drains fluid from the conduit 4 by suction when the main water valve 5 is closed and the air inlet 6 is open. The collector nozzle 21 can be used to seal against the irrigation system output port with the sprinkler head removed, or can be adapted to fit over the sprinkler head or to work with any other arrangement at an output port 10. Also, as necessary or to provide an advantage in using the system, one or more sprinkler heads or output ports 10 can be capped and sealed, or can be particularly adapted for use with a suction device as described herein, to provide the suction and passage needed to adequately drain a conduit 4.

FIG. 3 shows an output port 10 in the form of a sprinkler body 30, with the sprinkler head 31 locked down using a lock ring 32 and seal ring 33. FIG. 4 shows an alternative one-piece lock ring/head assembly 41 to be used with a sprinkler body 40. FIG. 5 shows a similar seal cap 51 used in systems utilizing an anti-siphon valve 50. FIG. 6 shows a simple seal ring 61 and cap 62 to be used, for example, to cap the receptacle 7,

60. Use of such assemblies is described in more detail below in the disclosure of an exemplary method of the invention.

The suction device 20 shown in FIG. 2 also includes a suction head 23 and water release valve 24 for discharging effluent. The suction head 23 has a motor to create suction force, using an impeller or other implement to create negative air pressure. The device also includes an exhaust vent 25 to exhaust air during the suction process. The collector nozzle 21 and tube 22 are connected to the suction head 23 such that when the nozzle 21 is sealed against an output port 10 of the irrigation system 1, the negative air pressure created by the suction head 23 is applied to the interior of the conduit 4 to remove fluid from the conduit 4. The water release valve 24 is connected to the suction head 23 and is used to discharge fluid drained from the conduit 4 by the suction head 23 through the collection nozzle 21. Instead of a valve, the suction device 20 can instead have a simple open pipe or other drain to allow the fluid to run freely from the device 20. However, including the valve 24 allows for controlled discharge of water at a time and place that are the choosing of the user. The suction device 20 can also include a collection chamber 26, disposed between the suction head 23 and the release valve 24, used to store fluid drained from the conduit 4. The collection chamber 26 can include a fluid level indicator 27 to show the amount of fluid drained from the conduit 4. The collection chamber 26 can also include an internal float safety switch that triggers deactivation of the suction device motor when it detects that fluid in the collection chamber 26 has reached a predetermined level.

The suction device 20 shown in FIG. 2 is a portable unit, although non-portable versions of the invention are contemplated, as described in more detail below. In this exemplary embodiment, the suction head 23 is arranged above the collector nozzle 21 so as to be supported at least in part by the nozzle 21 and the rigid collector tube 22 when the nozzle 21 is sealed against an output port 10 of the irrigation system 1 and the suction device 20 is in use. One or more handles 28 can be included on the suction device housing, to assist the user in stabilizing the device 20.

Figure 7:
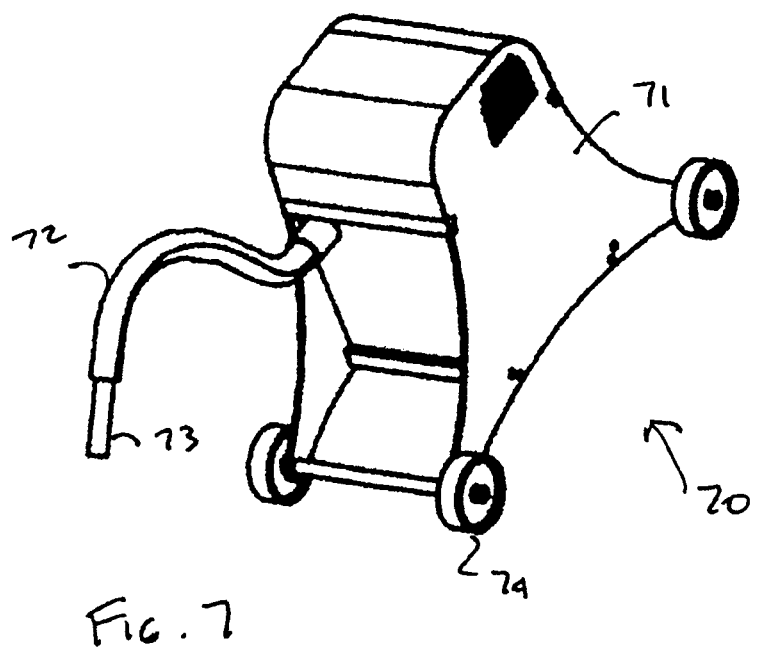
FIG. 7 shows an exemplary portable suction device.

In alternative embodiments, the suction device can also include a flexible or curved collection tube disposed between the suction nozzle and the suction head, so that the suction device can be used without the suction head being supported on the nozzle. For example, FIG. 7 shows such an alternative embodiment. As shown, according to this embodiment, the suction device 70 includes a housing 71 and a flexible collection tube 72 disposed between the collector nozzle 73 and the suction head within the housing 71. The housing 71 includes wheels 74 to allow the device 70 to be rolled to the output port 10 of use, and the housing 71 supports the suction head while in use.

Figure 8:
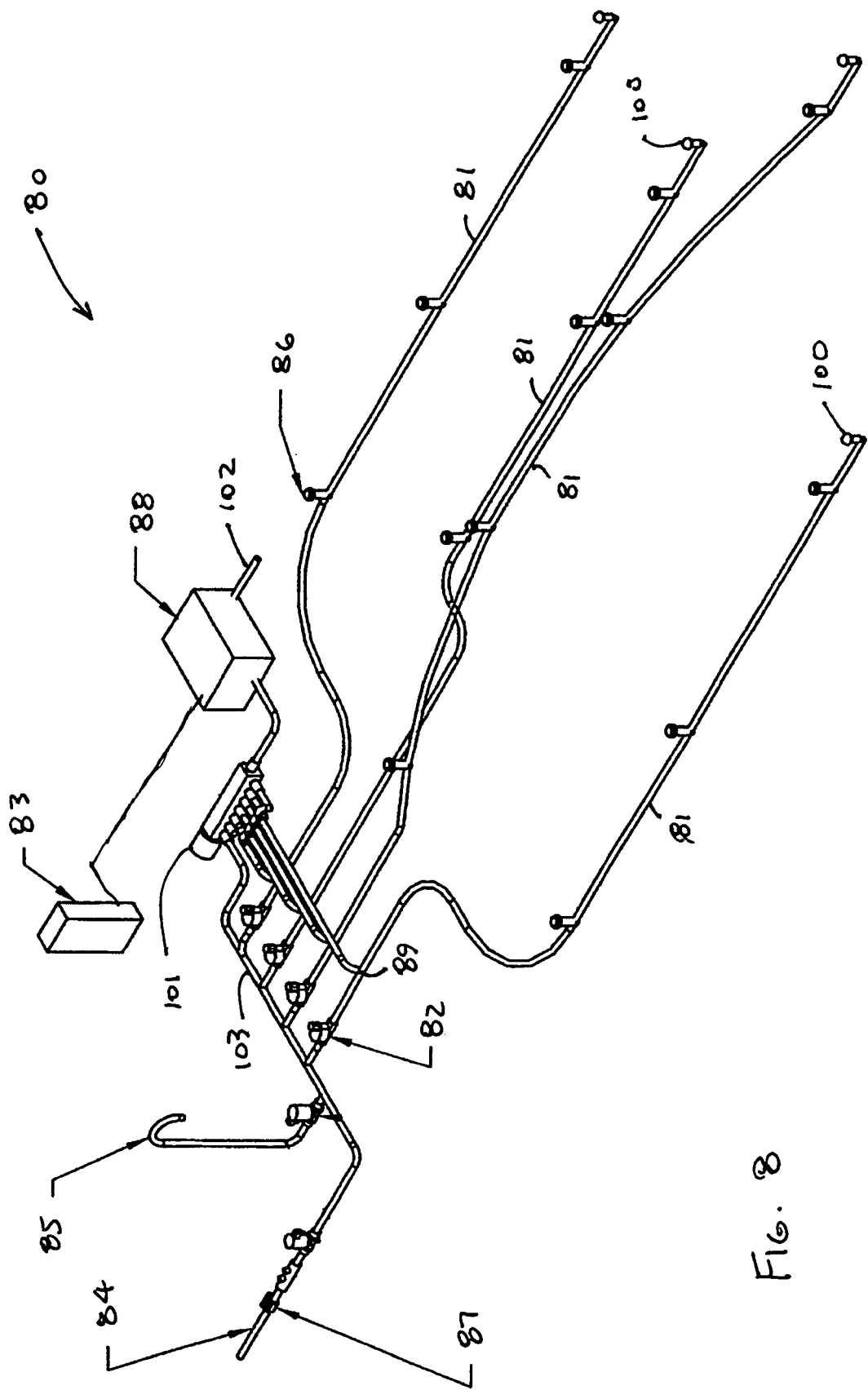
FIG. 8 shows a layout of an exemplary irrigation system with a central suction device.

The apparatus of the invention can also be embodied as a fixed system, integrated as part of an irrigation system having one or more conduits arranged in zones. FIG. 8 shows a system 80 with multiple zones 81 including a respective number of zone valves 82 for individual control of irrigation by each zone. This control can be applied manually, or in some systems, can be automatically controlled by an electronic control unit (ECU) 83. The following discussion will apply to a system having multiple zones, in which a common water main 84 is supplied to the zones via a manifold having separate supply valves. In this exemplary embodiment, the system also includes a common air inlet 85 on the main side of the manifold. Each zone 81 conduit has at least one output port 86 and has one air inlet valve 100, preferably at the end of each zone. The air inlet valve allows air into the zone when the suction device is applied to that zone so that fluid can be drained from the zone, but does not allow fluid out during normal operation of the system. In the case of a system having manual control of the zones 81, a portable suction device as described above can be used, where the process of draining the conduit is applied to each zone 81 in sequence.

In the case where the apparatus of the invention also includes an ECU 83 that is adapted to open and close individual zone valves 82 automatically, use of the suction device on output ports 86 of the respective zones can be coordinated with the opening and closing of the respective zone valves 82. The ECU 83 can also be adapted to control operation of a suction device that is connected to the system.

For example, the ECU 83 can be set up to open and close individual zone valves 82 sequentially, and to cycle through the sequence at a predetermined rate. The ECU 83 can also be adapted to open and close the main water source valve 87 automatically, and to perform other automatic system functions, such as through the control of solenoid valves and a rotary valve assembly 101 or other processor-controllable valve device. As shown in FIG. 8, a central suction device 88 according to the invention can be installed for the draining of all zones 81. Under the control of the ECU 83, the suction device 88 is turned on and off according to the timing of control of the valves 82 by the ECU 83. Water is drained from the zone conduits at fixed connections 89 and discharged through an output port 102 on the suction device 88. The suction device 88 can include an internal pump or other discharge unit to help discharge water collected from the zones. This allows collected water to be transferred to a desired location, such as a gray-water capture tank.

The rotary valve assembly 101 is coupled between the suction device 88 and the zone conduits 81, making fluid communication connection with the zone conduits 81 at the fixed connections 89. Under the control of the ECU 83, the rotary valve assemble will select a zone conduit 81 that will be coupled for fluid communication with the suction device 88 in order for evacuation of that zone conduit 81 to take place. The ECU 83 is programmed to sequence through the rotary valve assembly 101 in order to synchronize evacuation until the draining process is complete. As shown in FIG. 8, the rotary valve assembly 101 can also be connected to the main line side of the manifold 103 so that the system back to the main water source valve 87 can also be drained, preferably after the zone conduits 81 have been drained.

This main-side connection also allows the rotary valve assembly 101 to select zones for operation during a normal irrigation process of the system 80. That is, the rotary valve assembly 101, under control of the ECU 83, selects which input port (the manifold 102 or the suction device 88 input) is connected to the zone or zones on the other side of the valve assembly. It should be apparent to one of skill in the art that an n-bit control signal from the ECU 83 can control connection of the selected input to any one of $2^n$ zones for irrigation of draining. Thus, the rotary valve can be used to replace the zone valves 82 entirely, which can result in savings with respect to both equipment costs and maintenance costs, as well as providing ease-of-use benefits.

Figure 9:
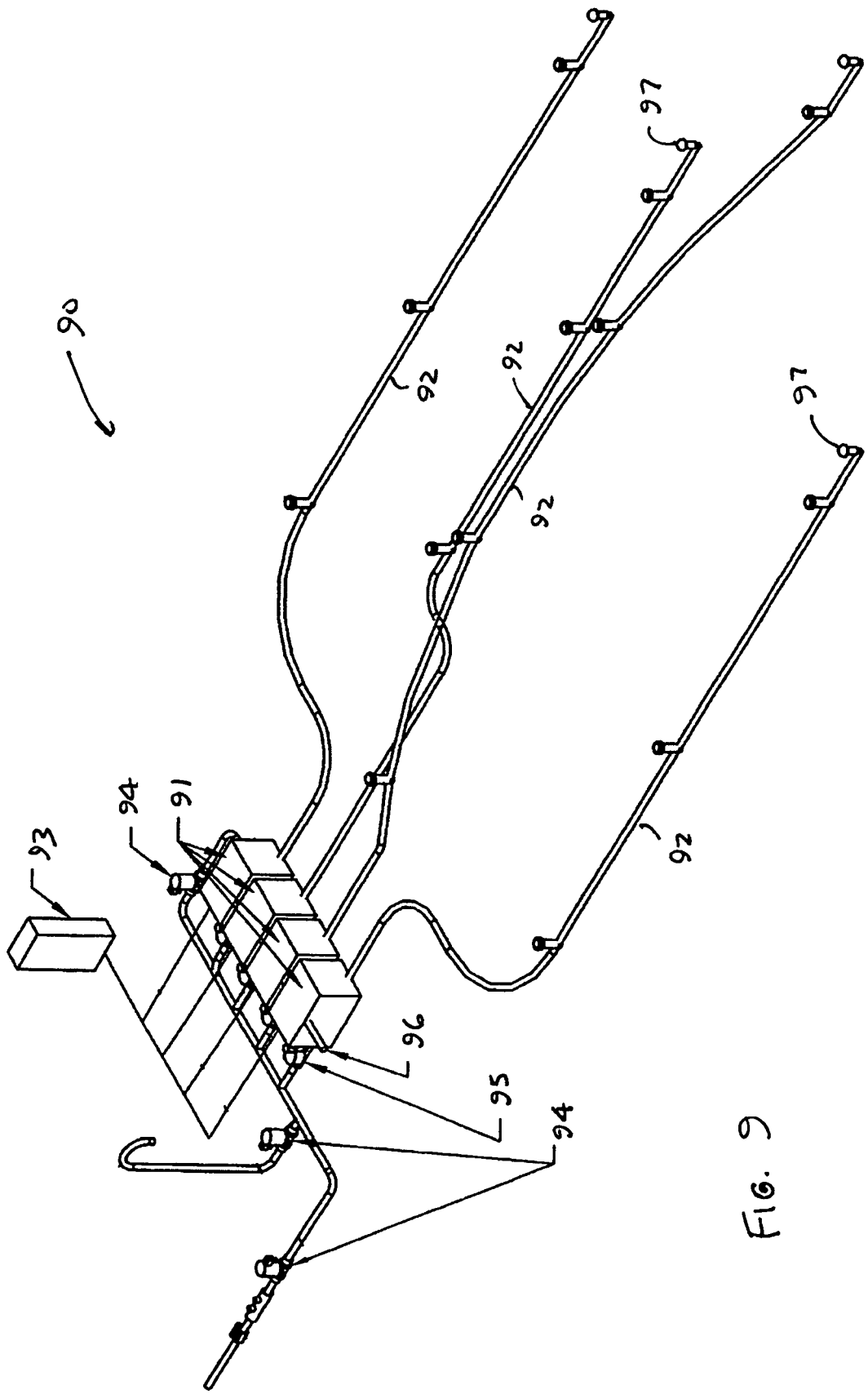
FIG. 9 shows a layout of an exemplary irrigation system with an in-line suction device arrangement.

Alternatively, as shown in FIG. 9, multiple in-line suction devices 91, one for each zone 92 to be controlled, can be installed. As in the system of FIG. 8, this system 90 includes an ECU 93 that controls solenoid valves 94 or other controllable valves, as well as the zone valves 95, to coordinate with the in-line suction devices 91 to evacuate fluid in the zone 92 conduits to a discharge output port 96, and an air inlet valve 97 at the end of each zone. In either case, it is preferred that the device according to the invention be controlled by the ECU 83, 93, so as not to conflict with normal system functions, which preferably are also controlled by the ECU 83, 93. To this end, the suction device 88, 91 can be retrofitted to an existing system 80, 90 as an auxiliary device, or can be designed into new systems as a factory component.

The system 80, 90 can also include a remote input device so that the user can provide commands to the ECU 83, 93 from a remote location, such as from inside the house. This remote controller can also be used to send commands to the system to initiate and perform the draining process described herein.

The system of the invention can also be made to operate automatically according to predetermined sensed parameters, such as environmental conditions. For example, the ECU 83, 93 or suction device 88, 91 can include a device that senses the desired parameter and provides associated parameter data to a processor in the ECU 83, 93. The ECU 83, 93 can then actuate the suction device 88, 91 and begin the evacuation procedure automatically when the parameter data provided to the processor falls within a predetermined range. For example, the parameter sensing device can be a thermometer device that senses ambient temperature, or a temperature of the ground at or below the surface, and which provides temperature data corresponding to the sensed temperature. Thus, when the sensed temperature falls below a certain value, the corresponding temperature data will cause the ECU 83, 93 to drain the conduits automatically, preferably by initiating a sequential draining according to zone.

An exemplary process for using a system such as that described above is now disclosed. In order to prepare for use of the system, the user should first locate the main water valve and electrical control panel (if present) of the sprinkler system, and the location of the zone valves or zone valve manifold, which might be buried underground.

Next, it is helpful to draw a map of the sprinklers, identified by zone. To do so, the user opens one zone at a time, either manually or from the electrical control panel. The sprinklers will function, making it easy to identify, locate, and map each sprinkler in a particular zone, and to number each sprinkler on the system diagram. The zones should also be numbered, and if a control panel is present, the numbering should be consistent with control panel zone assignments.

The user will then close the main water valve for the sprinkler system, and should also test that the supply to the system is cut off by opening at least one zone valve and checking for any spray from the sprinkler heads. Systems with a faucet, spigot, or air compressor hook-up should have that fixture open during water removal, and closed afterwards. Systems with anti-siphoning zone valves must seal the anti-siphon portion of the valve, such as with a sealing cap, prior to water removal, and removed after water removal, for each zone. Because anti-siphon valves must be installed a certain distance above ground level, they are usually easy to locate.

Once the preparation described above is complete, water removal from a first zone can begin. The sprinkler of the first zone to be drained that is closest to the zone valves or zone valve manifold is identified, and the lock ring 32 (see FIG. 3) for that sprinkler is removed. The sprinkler head 31 can then be removed from the sprinkler body 30, preferably after first marking the relative positions of the head 31 and the body 30 for correct reinstallation after draining. After removing the sprinkler head 31, the seal ring 33 is inserted under the lock ring 32 and the lock ring 32 is re-installed over the seal ring 33, to ensure that the output port is sealed for use with the suction device. If the sprinkler head and lock ring form a one-piece assembly 41 (see FIG. 4), a replacement lock ring can be provided and used in place of the arrangement described above.

The lock ring and sprinkler head of the last sprinkler in that same zone are then removed, to allow air to flow into the zone during water removal. The zone valve for that zone is then opened, and the nozzle of the portable suction device is inserted through the seal ring in the first sprinkler assembly. The suction device is then turned on to evacuate water from the system. The device can be run for a predetermined amount of time known to complete the evacuation process, or the water level indicator can be observed to determine when adequate evacuation has taken place. For sprinkler systems located on hilly terrain, where one or more sprinklers is located at a height that is substantially greater than that of other sprinklers, repetition of the process at intermediate sprinkler locations might be required in order to adequately drain the zone.

Once draining is complete, the zone valve for the evacuated zone is closed, and the closest sprinkler head is reinstalled to its original configuration, or to another operational configuration. The evacuation procedure can then be repeated for the other zones. Once all the zones have been evacuated, the suction device should be attached to the receptacle on the main side of the manifold and operated so that the manifold and main delivery line can be drained as well. All of the zone valves should be closed during this portion of the procedure.

The process described above is directed to use of a portable suction device. Automatic control of an integrated suction device, such as the central and in-line systems described above, follows a similar procedure, with the electronic controller of the sprinkler system also controlling opening and closing of valves and sequencing of the integrated suction device. With a suction device in place as part of such an integrated system, the ECU will require programming to be able to implement, run, and possibly automate the fluid evacuation procedure.

In general, draining an irrigation system according to the invention includes first closing a fluid source connection for the irrigation system. An air inlet of the irrigation system is opened, and optionally at least one output port of a conduit of the irrigation system is sealed closed. Fluid is drained from the irrigation system conduit through the output port using a suction device, which is either portable or integrated as part of the system. Portable units must be connected to an output port of the system, either one used as a sprinkler head port or other port used by the system, or a dedicated port used only for draining the system. Integrated units can be controlled by a system ECU.

Preferred and alternative embodiments have been described in detail above. These embodiments are not intended to be limiting of the invention, but rather merely illustrate the inventive concept. The invention is recited in the following claims, which should be given the broadest scope of interpretation in view of the description and reasonable equivalents.

We claim:
1. An irrigation system, comprising:
a conduit having a fluid source connection;
an air inlet;
at least one above-ground irrigation output port;
only above-ground open output ports; and
a suction device;
herein the suction device includes an input port that is adapted to access an interior of the conduit, and to drain fluid only from inside the conduit by suction when the fluid source connection is closed and the air inlet is open.
2. The irrigation system of claim 1, wherein:
the conduit is a plurality of conduits; and each said conduit has at least one above-ground irrigation output port and no open below-ground irrigation port;

the irrigation system further comprising:

a respective plurality of valves coupling the fluid source connection to the plurality of conduits; and a control device that is adapted to open and close individual valves of the plurality of valves automatically to coordinate with use of the suction device on the respective conduits.

3. The irrigation system of claim 2, wherein the control device is adapted to control operation of the suction device.

4. The irrigation system of claim 3, wherein the control device is adapted to open and close individual valves of the plurality of valves sequentially.

5. The irrigation system of claim 3, wherein the control device is adapted to open and close the fluid source connection.

6. The irrigation system of claim 3, wherein the control device includes a processor, the irrigation system further including a remote input device that is adapted to accept user inputs and provide corresponding input signals to the processor.

7. The irrigation system of claim 6, further comprising a parameter-reading device that is adapted to provide parameter data to the processor.

8. The irrigation system of claim 7, wherein the control device is adapted to actuate the suction device automatically when the parameter data provided to the processor falls within a predetermined range.

9. The irrigation system of claim 8, wherein the parameter data is temperature data and the predetermined range is values of temperature data corresponding to temperature below a predetermined threshold.

10. The irrigation system of claim 3, wherein the suction device and the control device are integrated and adapted to be connected to the irrigation system as a unitary device.

11. The irrigation system of claim 2, wherein the control device is adapted to cycle through the sequence at a predetermined rate.

12. The irrigation system of claim 2, wherein each said conduit of the plurality of conduits is connected for fluid communication to the fluid source connection, and is otherwise not connected for fluid communication with any other of the plurality of conduits.

13. The irrigation system of claim 1, wherein the suction device includes a suction head having a motor and an impeller adapted to create negative air pressure, and an exhaust vent.

14. The irrigation system of claim 1, wherein at least one said above-ground irrigation output port is adapted to receive a sprinkler head.

* * * * *